(12) United States Patent
Panchenko et al.

(10) Patent No.: US 8,060,869 B1
(45) Date of Patent: Nov. 15, 2011

(54) METHOD AND SYSTEM FOR DETECTING MEMORY PROBLEMS IN USER PROGRAMS

(75) Inventors: Maksim V Panchenko, Mountain View, CA (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1171 days.

(21) Appl. No.: 11/811,096

(22) Filed: Jun. 8, 2007

(51) Int. Cl.
*G06F 9/45* (2006.01)
*G06F 9/445* (2006.01)

(52) U.S. Cl. ............................ 717/158; 717/128; 711/3

(58) Field of Classification Search .......... 717/124–128, 717/140–143, 157–159; 711/3, 169
See application file for complete search history.

(56) References Cited

U.S. PATENT DOCUMENTS

| | | | | |
|---|---|---|---|---|
| 5,408,650 A * | 4/1995 | Arsenault | | 717/124 |
| 5,805,863 A * | 9/1998 | Chang | | 717/158 |
| 5,895,497 A * | 4/1999 | Anderson | | 711/169 |
| 5,953,530 A * | 9/1999 | Rishi et al. | | 717/127 |
| 6,029,002 A * | 2/2000 | Afifi et al. | | 717/131 |
| 6,223,339 B1 * | 4/2001 | Shah et al. | | 717/158 |
| 6,305,010 B2 * | 10/2001 | Agarwal | | 717/126 |
| 6,481,008 B1 * | 11/2002 | Chaiken et al. | | 717/158 |
| 6,634,020 B1 * | 10/2003 | Bates et al. | | 717/131 |
| 6,658,652 B1 * | 12/2003 | Alexander et al. | | 717/128 |
| 6,862,696 B1 * | 3/2005 | Voas et al. | | 714/38.11 |
| 7,146,607 B2 * | 12/2006 | Nair et al. | | 717/151 |
| 7,240,332 B2 * | 7/2007 | Berg et al. | | 717/126 |
| 7,240,335 B2 * | 7/2007 | Angel et al. | | 717/130 |
| 7,293,142 B1 * | 11/2007 | Xu et al. | | 711/124 |
| 7,363,419 B2 * | 4/2008 | Cronin et al. | | 711/5 |
| 7,590,792 B2 * | 9/2009 | Yamaga et al. | | 711/3 |
| 7,873,945 B2 * | 1/2011 | Musuvathi et al. | | 717/124 |
| 7,926,043 B2 * | 4/2011 | Vaswani et al. | | 717/130 |

OTHER PUBLICATIONS

Ho et al, "A hardware/software approach to detect memory corruptions in embedded systems", IEEE, pp. 285-290, 2010.*
Nguyen et al, "Detecting and eliminating memory leaks using cycle memory allocation", ACM ISMM, pp. 15-29, 2007.*
Clause et al, "Leakpoint: Pinpointing the causes of memory leaks", ACM ICSE, pp. 515-524, 2010.*
Mytkowicz et al, "Inferred call path profiling", ACM OOPSLA, pp. 175-189, 2009.*

(Continued)

*Primary Examiner* — Anil Khatri
(74) *Attorney, Agent, or Firm* — Martine Penilla Group, LLP

(57) ABSTRACT

A method and system for providing a binary instrumentation tool to detect memory problems in a runtime application executing on a computer system includes identifying one or more functions or statements in the runtime application. A plurality of compiler annotations defining essential functional characteristic data of each of the plurality of functions is generated by a compiler when compiling the user program from source code to an executable binary code. A program error detector is configured to provide a checker code based on guidelines provided by of the plurality of compiler annotations associated with the function. The program error detector generates a modified function code for the identified function by inserting the checker code into a function code for the corresponding function. A modified executable binary code for the runtime application is then generated by replacing the function code for the function with the corresponding modified function code. When the modified executable binary code is run, the checker code associated with the function invokes a checker. The invoked checker provides performance data analysis that allows identification of program errors including memory errors in the runtime application.

20 Claims, 7 Drawing Sheets

OTHER PUBLICATIONS

Unknown, "*Valgrind*", http://en.wikipedia.org/wiki/Valgrind, Aug. 8, 2007, 4 pages, GNU Free Documentation License.

Unknown, "*Bcheck*", http://en.wikipedia.org/wiki/Bcheck, Aug. 8, 2007, 1 page, GNU Free Documentation License.

* cited by examiner

METHOD AND SYSTEM FOR DETECTING MEMORY PROBLEMS IN USER PROGRAMS

FIELD OF THE INVENTION

The present invention relates generally to binary instrumentation in computing systems, and more particularly to, a method and system for generating binary instrumentation using compiler annotations and user defined memory semantics for detecting memory problems in user programs.

BACKGROUND

Description of the Related Art

High level programming languages such as C and C++ provide a programmer full control of the program memory while providing little protection against common programming errors, such as memory-related errors and access violations. As hardware and software systems grow in complexity, tools to improve program quality, security and speed become more invaluable. To help understand and identify the nature of errors and violations, performance analysis tools have been employed. However, these performance analysis tools provide a very high level overview of the system performance and a cursory view of the errors and violations. It would be useful if these performance analysis tools provide more in-depth observation capabilities at all levels of the system.

One such way of providing more in-depth observation capabilities is by providing instrumentation to an application program. Instrumentation of the application program is necessary to capture performance data. Instrumentation is a process of inserting trace statements into a program, which when compiled and executed provide trace data. Performance trace data of various types can provide valuable insights into program behavior and provide a way to modify program to improve performance.

Instrumentation may be inserted at various stages of the program such as at initialization time of source code, at compile-time, at link-time, at program execution time wherein instrumenting executable code may be performed statically or dynamically. These instrumentations have mechanisms that vary in complexity, in flexibility and in the level of detail and are based on user's control of what data needs to be collected. The instrumented code may have to be re-compiled and/or re-linked in order for the instrumentation code to be effectively associated with the appropriate parts of the program. As the program executes, trace statements inserted as instructions and probes are activated, which perform measurements and provide performance data. Thus, instrumentation may be used to expose key characteristics of an executing program.

Performance analysis is typically performed on a source code or a compiled program by inserting instrumentation code at an appropriate stage. In order for the performance analysis tool to provide instrumentation, detailed information about the contents of the code are necessary. The static analysis is typically performed by a traditional compiler on a source code without running it. The static analyses include analysis for correctness (type checking) and analyses for optimization in the program. Dynamic analysis analyzes a program by observing the run-time behavior of the program while the program executes. In dynamic analysis, the instrumentation codes inserted into appropriate locations of the compiled executable code gathers performance related data as the program executes. There are many pros and cons related to static analysis and dynamic analysis. Static analysis considers all execution paths that a program may take during execution but is much slower. Dynamic analysis, on the other hand, considers data related to only a single execution path that a executing program follows but is simple and more precise as it works with real values.

Dynamic analysis can be used for optimizations (profiling and tracing), error detection (testing, assertion checking, type checking, memory safety and leak detection), and program understanding (coverage). Typically, in dynamic analysis information related to an executing program may be obtained by modifying either the source code or the compiled binary code of the source code. The analysis using source code modification is relatively easy to implement as detailed understanding of the contents of the code is possible. Instrumentation codes are inserted into the appropriate locations in the source code and the compiler compiles the source code and the source code modifications together. Source code analysis is language-specific and platform independent and requires access to source code.

The compiled binary code analysis is possible by inserting instrumentation codes at appropriate locations in the compiled executable binary code. In order to instrument the compiled binary code, a greater understanding of the executable binary code is required. In cases where parts of the source code or the library code referred by the source code is not native to the system, performance analysis tools rely on heuristic approach where the detailed information of the corresponding parts of the source code are guessed. This approach fails to produce a more robust performance analysis tool. Further, when parts of the source code are added or modified, the original detailed information related to the compiled binary code are no longer accurate and have to be recompiled. This results in an analysis tool that is highly inefficient and unreliable.

Therefore there is a need for a more robust performance analysis tool that can be used in obtaining performance analysis data of a runtime application without having to re-link or re-compile the executable code. There is also a need to provide an analysis tool that is simple to implement and is able to detect common programming errors without having to guess. There is also a need for an analysis tool that is portable across all platforms and across all programming languages and provides greater flexibility.

SUMMARY

The present invention fills the need by providing a performance analysis tool (binary instrumentation tool) to detect memory problems in a runtime application executing on a computer system. The runtime application includes a plurality of functions or statements having instructions that access memory. A plurality of compiler annotations defining essential functional characteristic data of each of the plurality of functions, including instructions that access memory, is generated by a compiler when compiling the user program from source code to an executable binary code. The binary instrumentation tool includes a program error detector configured to provide a checker code for the plurality of compiler annotations associated with the function. The program error detector generates a modified function code for the function by inserting the checker code into a function code for the corresponding function. A modified executable binary code for the runtime application is then generated by replacing the function code for the function with the corresponding modified function code. When the modified executable binary code is run, the checker code associated with the function invokes a checker. The invoked checker provides performance analysis data that allows identification of program memory errors in the runtime application. It should be appreciated that the present invention can be implemented in numerous ways such as a system or a method.

In one embodiment, a method for providing binary instrumentation tool to detect memory problems in runtime application is disclosed. The method includes examining a source code of the runtime application to identify a function having an instruction that accesses memory. An annotation section is generated by a compiler when compiling the source code into an executable binary code. The annotation section is associated with the executable binary code and includes one or more compiler annotations for each of the functions in the runtime application. The compiler annotations define essential functional characteristic data related to the identified function based on examination of the instruction. A program error detector (PED) defines a checker code for the compiler annotations in the annotation section. A modified function code is obtained by inserting the appropriate checker code into a corresponding function code for the identified function based on the compiler annotations associated with the function. A modified executable binary code of the runtime application is generated by the PED by replacing the function code for the identified function with the corresponding modified function code. The modified executable binary code invokes a checker upon execution of the appropriate function. The checker enables efficient identification of program errors including memory errors associated with the runtime application.

In another embodiment, a system for providing binary instrumentation tool to detect memory problems in a runtime application executing on a computer system, is disclosed. The computer system includes a compiler, a link editor and a program error detector (PED). A source code of the runtime application includes one or more functions each having one or more instructions. The compiler generates an annotation section while compiling the source code of the runtime application into an executable binary code. The annotation section includes one or more compiler annotations associated with the function. The compiler annotations define essential functional characteristic data related to the function based on examination of the instruction. The generated annotation section is associated with the compiled executable binary code of the source code. The link editor links all the compiled objects generated by the compiler into one executable binary code. The program error detector provides a checker code for the compiler annotations in the annotation section associated with the executable binary code. A modified function code for the function is generated by inserting the checker code for the function into a corresponding function code. A modified executable binary code of the runtime application is generated by replacing the original function code for the function with the corresponding generated modified function code. The checker code invokes a checker upon execution of the appropriate function in the executable binary code. The invoked checker enables efficient identification of program errors including memory errors associated with the runtime application.

The present invention, thus, describes a method and system for providing a binary instrumentation tool to detect memory problems in a runtime application executing on a computer system. The embodiments of the present invention include providing essential functional characteristic data description of all functions associated with a source code, including functions that are non-native and have instructions accessing memory, so that memory problems associated with runtime application can be efficiently detected. The tool is robust and flexible enough to be adaptable across all platforms and across all languages and does not require source code to be re-compiled or re-linked when codes are added or modified.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

Figure 1:
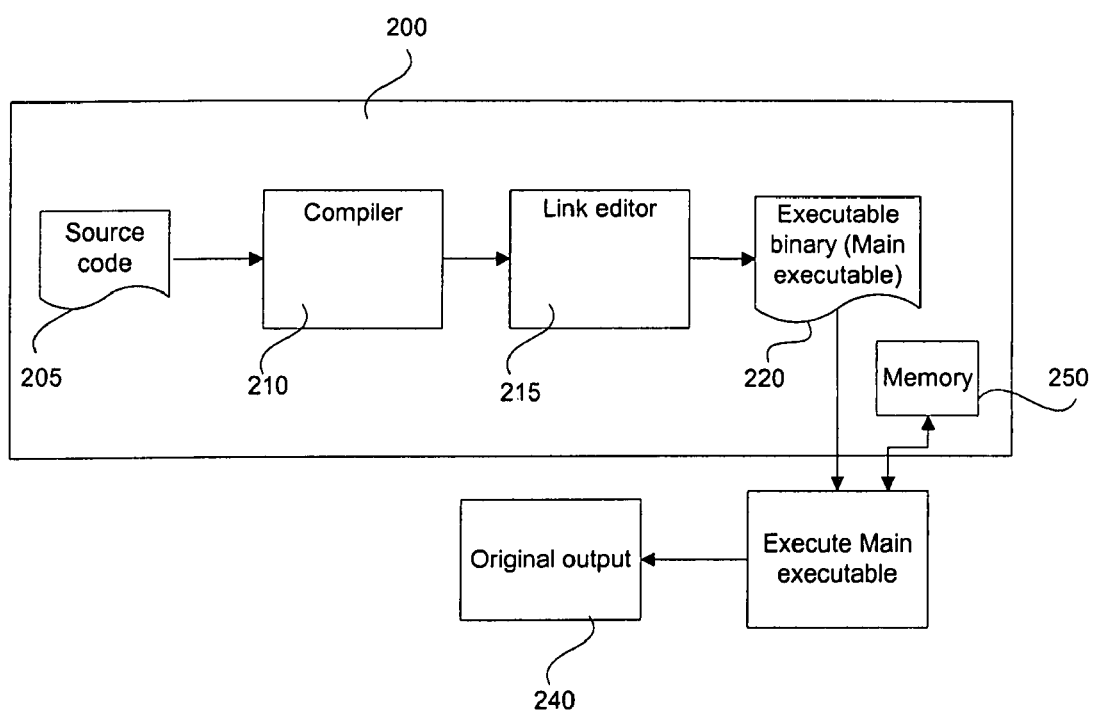
FIG. 1 illustrates an overview of a general computer system architecture, in one embodiment of the invention.

The present invention provides a binary instrumentation tool implemented on a computer system to detect memory problems in a runtime application executing on the computer system. Memory related errors in programs are notoriously difficult to find. For example, if the programmer allocates an array and forgets to initialize it, then tries to read from one of the array locations, the program will probably behave erratically. The binary instrumentation tool of the present invention allows programmers to easily find such errors by providing the details of the location where the program error exists so that the error can be addressed efficiently.

The binary instrumentation tool provides checker codes for various functions having instructions available in a source code of the runtime application including functions having instructions that access memory. Conventionally, checker codes may be inserted at various stages of the program such as initialization time of source code, at compile-time, at link-time, at program execution time wherein inserting checker code may be performed statically or dynamically. However, insertion of checker codes during initialization time, compile-time or link-time would require the source code to be re-compiled and/or re-linked in order for the checker code to take effect. In the embodiments of the present invention, the checker codes are inserted into a function code of a function at the executable binary code level of the source code. The inserted checker code invokes a checker upon execution of the appropriate function. The checker provides detailed information related to the executing function based on defined checker code rules so that problems associated with memory access in the runtime application may be easily and efficiently identified and addressed. As the checker codes are inserted at the executable binary code level of the program, there is no need to re-compile or re-link the source code due to the insertion of the checker codes. Additionally, when new functions are added or existing functions are modified or deleted, new checker codes are defined and associated to the appropriate function or existing checker codes are modified by the binary instrumentation tool so that the executable binary code may continue to provide the necessary detailed information related with memory access in the runtime application, when executed.

It is easier to manage analysis of the runtime application using this tool without having to have a deeper understanding of the contents of the binary code. Moreover, the overhead associated with re-compiling and/or re-linking of the source codes are eliminated thus providing a more efficient and reliable binary instrumentation tool. Several embodiments for providing a binary instrumentation tool that detects memory problems in a runtime application are described. It should be appreciated that the present invention can be implemented in different ways such as a system or a method. It will be apparent to those skilled in the art that the present invention may be practiced without some or all of the specific details set forth herein. Although the tool used in detecting memory problems in user programs has been broadly defined to be a binary instrumentation tool, it should be understood that the tool is an error detection tool that uses the binary instrumentation technique for detecting program memory errors within the runtime application at the machine code level.

To facilitate an understanding of the embodiments, a generic architecture of a computer system will be described first. The process of the disclosed embodiments will then be described with reference to the generic architecture.

FIG. 1 illustrates a generic architecture of a computer system 200 used in executing a runtime application. Runtime application as used in this application refers to an application at runtime. The computer system 200 includes software in the form of a compiler 210 that is used to compile the runtime application available on the computer system 200. The compiler 210 compiles a source code 205 associated with the runtime application to generate a plurality of compiled objects. The source code 205 of the runtime application includes a plurality of functions and function calls to pre-defined and pre-compiled functions available to the runtime application in the form of object libraries (libraries). Some of the functions may include instructions that access memory 250 in the computer system 200. A second software in the form of a link editor 215, on the computer system 200, links the compiled objects with corresponding predefined libraries and generates a single executable binary code 220. The link editor 215 is configured to interact with the compiler 210 to receive the compiled objects. The link editor 215 may be integrated with the compiler 210 or may remain as a separate entity. The executable binary code 220 is then executed on the computer system 200 to obtain output related to the application. The computer system 200 may include a plurality of user interface for receiving data related to the executing runtime application and for displaying the output of the executing runtime application.

It is noteworthy that the present invention is not limited to the architecture of FIG. 1. For example, hand-held computers, notebook or laptop computers, set-top boxes or any other computing system (wired or wireless) capable of connecting to the Internet and running computer-executable process operations, as described below, may be used to implement the various aspects of the present invention. Additionally, the software program, in general, should be viewed as pieces of code, and such code can be written in other languages so long as codes' functionality enables the process operations of the present invention.

Figure 2A:
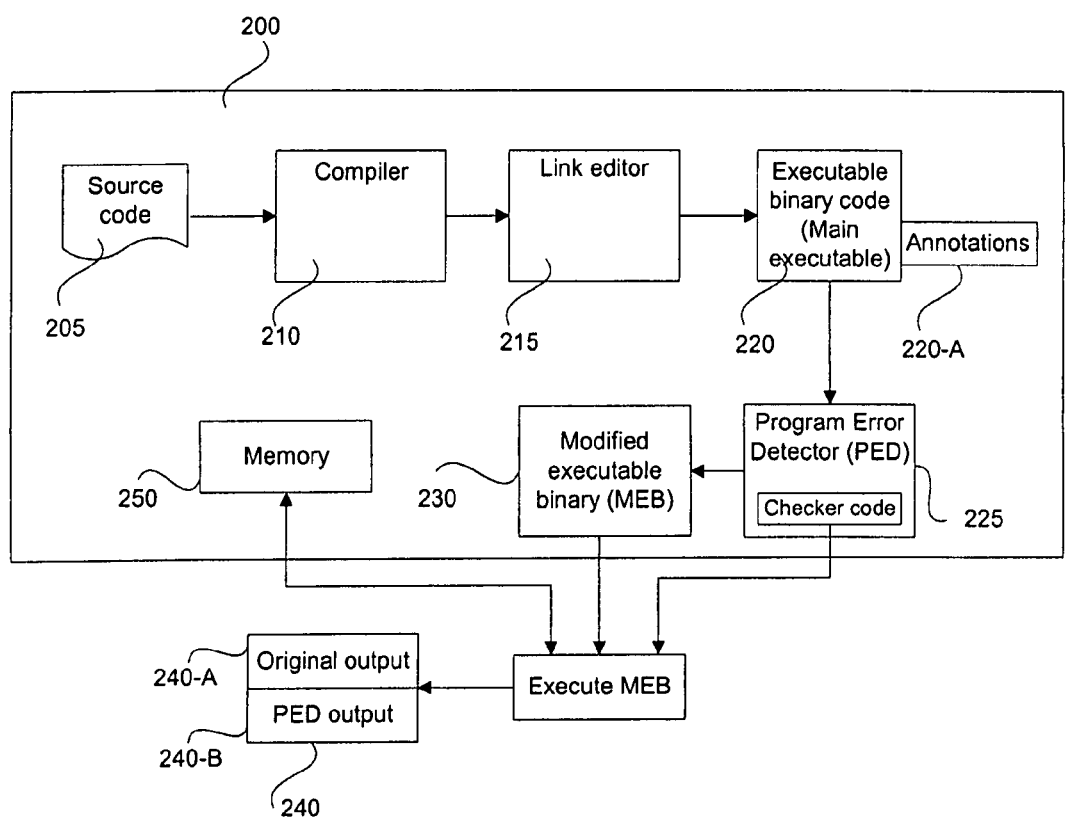
FIG. 2A illustrates an overview of the computer system architecture used in implementing a binary instrumentation, in one embodiment of the invention.

FIG. 2A illustrates a overview of the components of the computer system 200 associated with the implementation of a binary instrumentation tool, in one embodiment of the invention. As shown, a source code 205 of a runtime application is available on the computer system 200. The source code 205 may include functions and references (function calls) to precompiled and predefined functions available to the runtime application in the form of a library. Some of the functions, available in the source code 205, include one or more instructions that access memory 250. A compiler 210 provided on the computer system 200 compiles the source code into one or more compiled objects. The compiler 210, in this embodiment, is further configured to provide compiler annotations to one or more functions in the source code 205. The compiler generates one or more compiler annotations 220-A for each function(s) based on the type of instructions. The compiler annotations 220-A provide useful and detailed information defining the essential functional characteristic data of the function or the instruction of a source code. Compiler annotations 220-A for a function, for example, may include information such as function identification, function address, function boundaries, all possible jump locations for the function, information on incoming and outgoing function arguments, references to functions from non-executable code (data). Source code may readily provide these details about a function but when the source code is compiled into an executable binary code, such information is difficult to locate and decipher. The compiler annotations 220-A provide these detailed information for a function that can be used during the executable stage of the runtime application. In one embodiment, the compiler may organize the generated compiler annotations 220-A for an identified function into an annotation section within the compiled objects. More than one annotation section could be associated with the compiled objects.

A link editor 215 on the computer system 200, links the compiled objects with appropriate precompiled objects from a library into an executable binary code 220. During the link stage, the compiler annotations 220-A associated with each function in the compiled objects are combined and collectively associated with the executable binary code 220. In the embodiment where the compiler organizes the compiler annotations 220-A in a plurality of annotation sections, the plurality of annotation sections are combined and collectively associated with the executable binary code 220.

A program error detector (PED) 225, available on the computer system, uses the compiler annotations 220-A associated with the executable binary code 220 to define one or more checker codes for the compiler annotations 220-A. In one embodiment, the PED 225 complies with a set of pre-determined checker code rules while creating the checker code for the compiler annotations 220-A. In one embodiment, the PED 225 may be configurable to provide a new set of checker code rules. In this embodiment of configurable PED 225, the new set of checker code rules are determined based on the available compiler annotations 220-A. The PED 225 is provided with a user interface (not shown) to display the existing checker code rules (if any) and to receive any new set of checker code rules. The checker codes defined using the checker code rules, include essential trace statements which, when invoked, provide trace data. In instances where functions are modified or deleted or when new functions are added, the checker code rules are modified accordingly based on instructions within the modified or newly added function and the PED 225 generates new checker codes based on the modified set of checker code rules associated with the modified function.

The generated checker codes are inserted into appropriate locations in the executable binary code by the PED 225, based on the information available in the respective compiler annotations 220-A. This process of inserting checker code is called instrumentation and the process of providing instrumentation at an executable binary code stage is called binary instrumentation. Binary instrumentation is an effective tool in performing program analysis, debugging, security checks and simulation. The PED 225 performs the binary instrumentation by first examining a compiler annotation 220-A associated with the executable binary code 220. Using the information in the compiler annotation 220-A, such as function identification, function boundaries, etc., the PED 225 identifies a function to which the compiler annotation 220-A belongs. The PED 225, then, inserts the associated checker code at the appropriate location of a function code for the identified function to produce a modified function code. The PED 225, then, replaces an original function code of the identified function in the executable binary code with the modified function code to generate a modified executable binary code (MEB) 230. In one embodiment, the PED 225 may use its own heuristics and methods to insert checker code ignoring annotations. For example, PED 225 may find inserting checker code as advised by annotations redundant in some cases, or may perform a better placement of checker code than advised by annotations. In such cases, the PED 225 will insert checker code accordingly.

The MEB 230, upon execution on a processor (not shown) in the computer system 200, generates a set of outputs 240. The first output is the main executable output 240-A related to the runtime application. The second output is a PED output 240-B. The PED output 240-B is generated when a function with associated checker code is triggered from the running MEB 230. The triggered function invokes the checker code. The invoked checker code runs an associated checker which provides detailed information of the function from which the checker code was triggered based on a set of pre-defined checker code rules. The detailed information from the checker codes of the executed function are collected and consolidated into a PED output 240-B by the PED 225. The detailed information from the PED output 240-B may be used, among other things, to more accurately identify memory errors associated with one or more functions of the runtime application. By using this approach, the high level of compiler optimization is maintained and the overhead related to re-compiling and re-linking of objects is avoided. Additionally, any errors or bugs, introduced by compiler during compilation of source code 205, are effectively detected by this binary instrumentation tool thereby resulting in a highly reliable binary instrumentation tool.

In the above embodiment, the compiler annotations are provided by the compiler by analyzing the source code 205 available on the computer system 200. Some of the essential functional characteristics of a function that are included in the compiler annotations include function identification, boundaries of the function, list of all possible jump locations of the function, location of the function within the source code. The source code 205 of the runtime application may include functions and calls to precompiled functions. The precompiled functions may be precompiled objects within an object library, such as static library or dynamic library, or may be precompiled programs associated with non-native applications and provided as user provided executables (UPEs). For quality assurance purposes, these UPEs are all pre-tested for any program syntax errors. The source code for these precompiled functions may not be available locally on the computer system, that is they are not native to the computer system, or may not be included in the source code or the shared library. The binary instrumentation tool, in such cases, provides a way to instrument such non-native functions so that errors, such as memory errors, in such functions may also be traced.

Figure 2B:
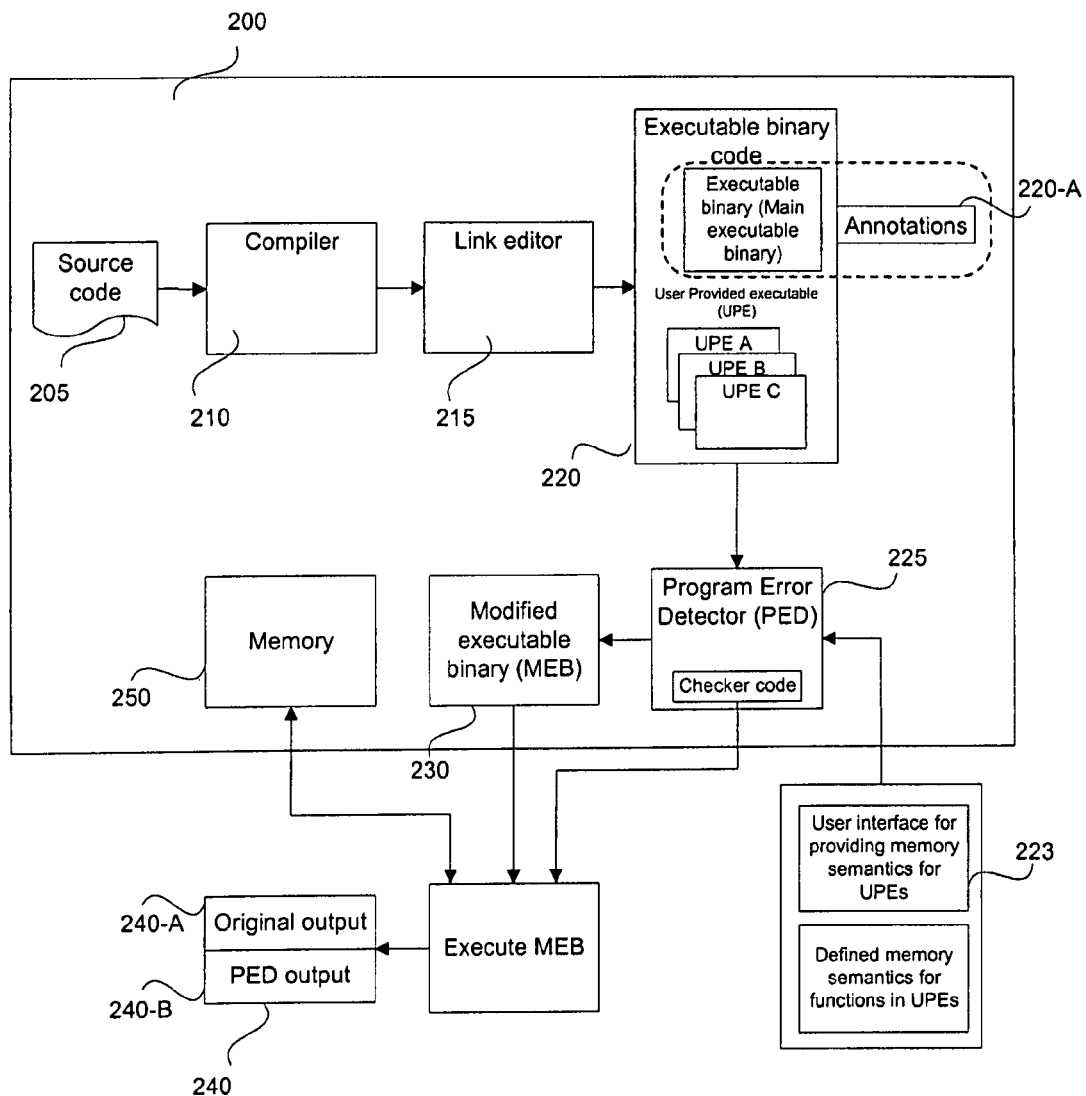
FIG. 2B illustrates an alternate embodiment of the invention illustrated in FIG. 2A.

FIG. 2B illustrates an alternate embodiment of the invention described in FIG. 2A. In this embodiment, the executable binary code 220 defined by the link editor may include the compiled objects from the source code 205 and a set of user provided executables (UPEs). The UPEs include precompiled objects with inaccessible or unavailable source codes, such as shared library objects, assembly language object or a third party library. In such cases, a user interface is used to receive information related to memory access. As shown in FIG. 2B, the executable binary code 220 includes a main executable binary code and a set of user provided executable binary codes (UPE A-UPE C). The main executable binary code includes compiled objects from the source code 205. A plurality of compiler annotations generated by the compiler 210 during compilation of the source code 205, are grouped together into an annotation section 220-A within the binary code of the compiled objects. The annotation section 220-A is associated with the main executable binary of the executable binary code 220. The compiler annotations and annotation section 220-A are used interchangeably in this application to refer to a set of compiler annotations that are generated by the compiler when compiling a source code 205 into a plurality of compiled objects. Although the embodiments are used in receiving and tracking memory related information, the embodiments are not restricted to memory related information but may include other non-memory related information that a user may wish to track.

A PED 225 available on the computer system 200, is used to provide checker code for the executable binary code 220 based on the plurality of compiler annotations in the annotation section 220-A. A user interface 223 is provided to the PED 225 and includes an output device, to display the set of UPEs referenced by the executable binary code 220, and an input device, to receive a set of defined memory semantic descriptions for each function in each of the UPEs having instructions that access memory. As the binary instrumentation tool of the present invention is used in tracking memory related issues, the information required from the UPEs is information related to memory operations in each function in each of the UPEs. The user interface 223 is provided to obtain such memory related information in the form of defined memory semantic descriptions for each of the function that access memory in each of the UPEs. Memory semantic descriptions are similar in structure and detail to the compiler annotations and provide essential functional characteristic data associated with functions in the UPEs. Some of the essential functional characteristic data of the function in the UPE that are received through an user interface may include function identification, boundaries of the function, list of all possible jump locations of the function, and location of the function within a corresponding UPE.

In one embodiment, the PED 225 may collect and organize the memory semantic descriptions into a memory semantic section for each function in the UPE that accesses memory or for each UPE object and associated with the corresponding executable binary code 220. Compiler annotations provide guidelines for inserting checker codes among other information. Checker codes are defined based on guidelines provided by compiler annotations and each memory semantic description associated with the executable binary code 220, by the PED 225. The checker codes include trace statements (checkers) that provide detailed trace data when the checker code is executed.

Although the current embodiment defines compiler annotations for compiled objects having instructions that access memory, it should be noted that the compiler annotations may be provided for all compiled objects having instructions that may or may not access memory. In this embodiment, the annotation section 220-A includes compiler annotations for all compiled objects and not just for compiled objects that have instructions that access memory. Similarly, the user interface 223 receives a set of information related to the pre-compiled objects in the UPEs including defined memory semantic descriptions for each function in each of the UPEs. The PED 225 inserts checker code into appropriate location within the executable binary code based on information available in the corresponding compiler annotations and memory semantic descriptions. The binary instrumentation tool, in this embodiment, is used in tracking memory related issues from both the compiled and pre-compiled objects. The checker codes include trace statements (checkers) that provide detailed trace data when the checker code is executed.

The trace statements in the checker code are generated based on one or more checker code rules. The checker code rules are defined based on compiler annotations and memory semantic descriptions and on level of detail required in the trace data by a user. The user interface 223, used to define memory semantics for functions in UPEs that access memory, may be used to define the checker code rules. The checker code rules may be pre-defined or configurable as and when functions accessing memory in the runtime application are added, modified, or deleted.

The PED 225 then inserts each of the defined checker code into an appropriate location in the executable binary code 220. The PED 225 may insert the appropriate checker code into a function code of a corresponding function or at an appropriate location within the executable binary code based on the information available in the corresponding compiler annotations or in the corresponding memory semantic descriptions. An original function code for a function is modified by the insertion of the corresponding checker code and the original function code in the executable binary code is replaced by the modified function code to generate a modified executable binary code 230. In the case where the checker code is directly inserted into the executable binary code 220, the insertion results in a modified executable binary code (MEB) 230.

The MEB 230, when executed, triggers the appropriate checker code within the MEB 230 which activates an associated checker. The activated checker provides detailed information pertaining to memory access to assist in detecting memory access problem associated with the runtime application. Some of the memory access problems that the PED 225 is designed to detect include uninitialized variable usage, memory leaks and location associated with memory leak, array access violation, stack access violation, access beyond stack bounds, access beyond array bounds, incorrect parameter for function calls, unallocated memory read or write, double freeing memory, free memory read or write, partially initialized data access, allocating zero size. The executing MEB 230 generates a set of output 240. The first output 240-A relates to the original executable binary and provides output data associated with the runtime application. The second output 240-B is a PED output that provides trace data associated with trace statements defined in the associated checker code. The trace data provide necessary information to identify memory access problems associated with a function (both native and non-native functions) in the runtime application.

The trace data from the PED output could be collected and stored as a PED output file. The PED output file may be used to display the PED output result on an output device of the user interface or may be used to create a report that may be accessed through the output device or may be used for diagnostic purposes.

Figure 2C:
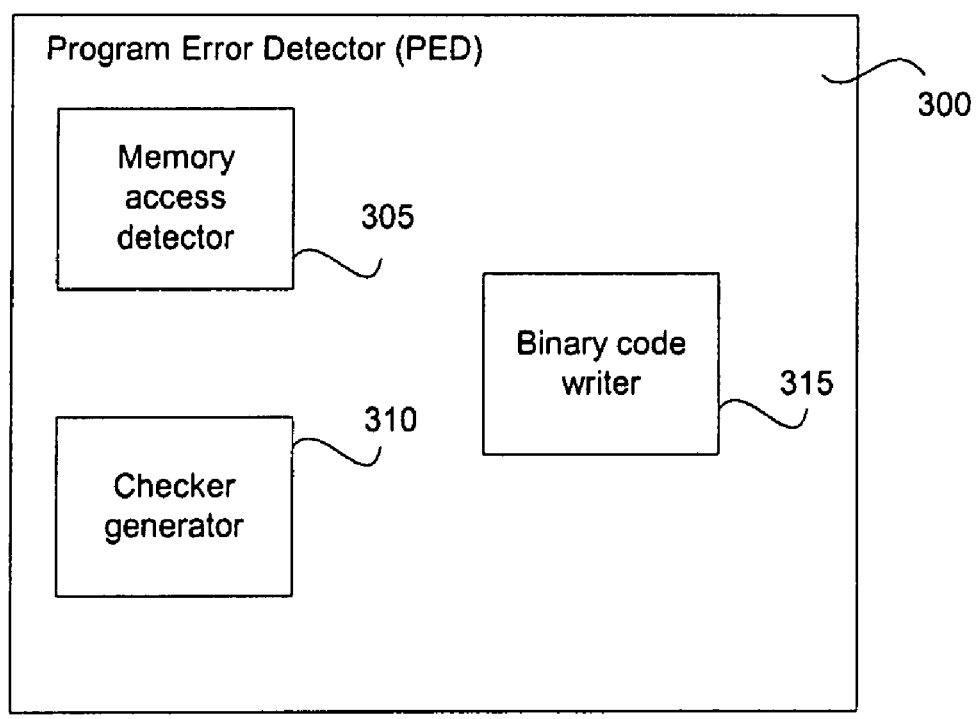
FIG. 2C illustrates a program error detector architecture, in one embodiment of the invention.

FIG. 2C illustrates components of a program error detector (PED) 225 available on a computer system 200. Each of the components of the PED 225 is configured to communicate with each other and with other components available to the computer system 200. The PED 225 includes a memory access detector 305 to detect functions or statements within a source code of the runtime application that request access to memory 250 on the computer system 200. As mentioned earlier, the functions that request memory access may be native or non-native to the computer system. The memory access detector 305 accesses compiler annotations and memory semantic descriptions associated with one or more functions of the runtime applications in order to determine the functions/statements that access memory 250. The memory access detector 305 of the PED 225 may also interact with a user interface to receive memory semantic descriptions for one or more user provided executables (UPEs). The memory semantic descriptions provide information to the memory access detector 305 to identify a function within an UPE that accesses memory.

In addition to the memory access detector 305, the PED 225 includes a checker generator 310 to generate a checker code having one or more trace statements that define a checker. The checker generator 310 may define a checker based on a plurality of checker code rules. The checker code rules may be defined based on one or more of type of compiler annotations, type of memory semantic descriptions, type and amount of information to be generated based on memory access issues encountered. The checker code rules may be pre-defined and available to the checker generator 310 or may be configurable through an user interface and made available to the checker generator 310. The checker code rules may be specific to a specific runtime application or may be generic to all runtime applications. The checker generator 310 interacts with the checker code rules when defining checker codes.

The PED 225 includes a binary code writer 315. The binary code writer 315 inserts one or more checker codes into appropriate location within the executable binary code 220 based on the information provided by the compiler annotations and memory semantic descriptions associated with the executable binary code 220. The binary code writer 315 inserts one or more checker codes into a function code of a function that is identified to have instructions that access memory, to generate a modified function code. The binary code writer 315 then generates a modified executable binary code (MEB) 230 by replacing a original function code for the identified function with the corresponding modified function code that includes inserted checker code(s) or by inserting the checker code directly into appropriate location in the executable binary code 220. The PED 225 enables successful instrumentation of both native and non-native source codes without having to redesign the PED 225, recompiling the source code or re-linking the compiled objects.

Figure 2D:
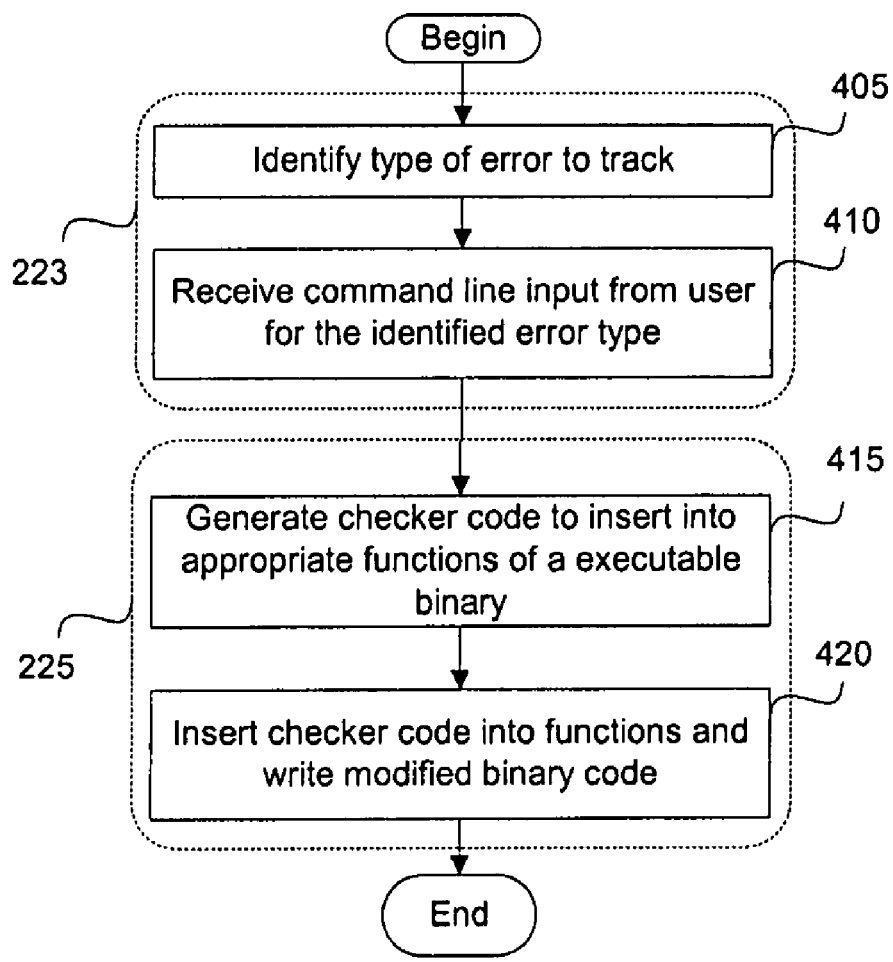
FIG. 2D illustrates a flowchart of operations involved in creating binary instrumentation for a user provided executable by a program error detector, in one embodiment of the invention.

FIG. 2D illustrates a flow chart of operations involved in defining checker codes for a runtime application, in one embodiment of the invention. The process begins at operation 405 wherein type of memory error to track is identified on a computer system 200. The type of memory error to track may be identified based on type of memory issues encountered and type of function. The type of memory error to track may be defined through an user interface. In one embodiment, the type of memory error to track may be pre-defined and stored as a file that is available to the components of a PED 225 on the computer system 200. In operation 410, a command line input from a user interface defining the type of error to track is received. In cases where function codes associated with memory access within the source code are modified, the command line input from a user interface might reflect the appropriate change to the type of error to track. In operation 415, a checker code is generated by the program error detector (PED) 225 based on the type of error being tracked. In operation 420, the generated checker code is inserted into appropriate location in the corresponding function to obtain a modified function code which replaces a original function code for the function in the executable binary code to generated a modified executable binary code (MEB) 230. The MEB 230, upon execution, provides the necessary trace data to enable detection of memory related errors.

Figure 3:
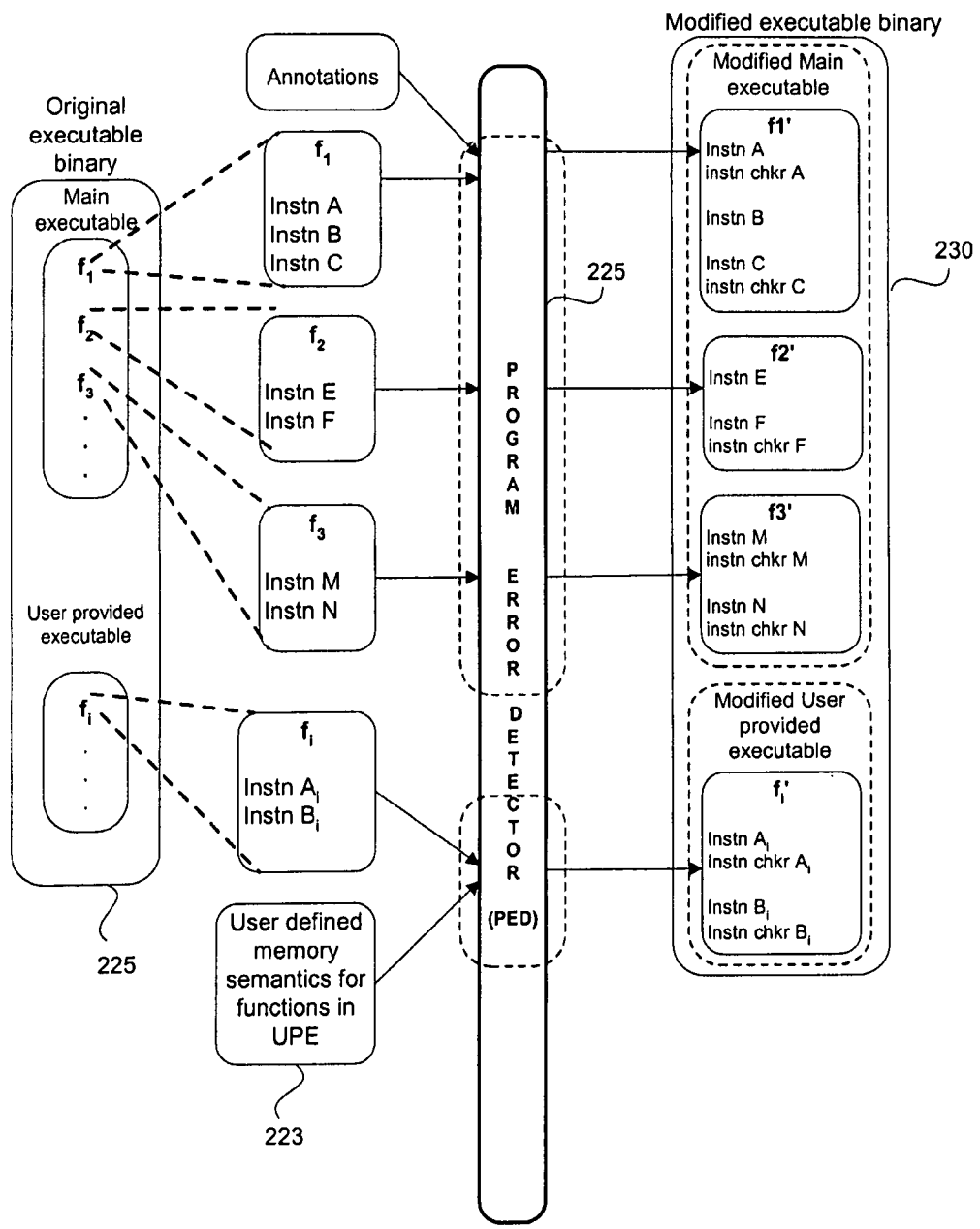
FIG. 3 illustrates an overview of binary instrumentation sequence, in one embodiment of the invention.

FIG. 3 illustrates an overview of binary instrumentation sequence, in one embodiment of the invention. The source code residing on a computer system 200 includes a plurality of functions ($f_1$, $f_2$, $f_3$, etc.) in a main executable binary code and a plurality of user provided executables (UPEs) function codes ($f_i$) that are called from within the main executable binary code. Each of the functions is associated with a plurality of instructions that access memory 250 of the computer system 200. For example, function $f_1$ includes instructions instn A, instn B and instn C with instructions instn A and instn C that access memory 250; function $f_2$ includes instructions instn E and instn F with instruction instn E accessing memory 250, function $f_3$ includes instns instn M and instn N that access memory 250, and function $f_i$ includes instructions instn $A_i$ and instn $B_i$ that access memory of the computer system 200. Additionally, functions $f_2$, and $f_3$ include function codes that are native to the computer system 200 and are accessible. Function $f_i$ is a precompiled function that is non-native wherein the source code is not available or inaccessible.

A compiler in the computer system 200 provides compiler annotations when compiling the main executable source code 205 into an original executable binary code (executable binary code). The compiler, in the embodiment illustrated in FIG. 3, provides compiler annotations for instructions instns A, C, F, M, and N of functions $f_1$, $f_2$, and $f_3$ respectively. A user interface provides defined memory semantics for user provided executables (UPEs) such as instns $A_i$ and $B_i$ of UPEs function $f_i$, as illustrated in FIG. 3. A program error detector (PED) 225 uses the compiler annotations and defined memory semantics to define checker codes for each of the annotations and defined memory semantics. Thus, instrn A in function $f_1$ has an associated defined checker code instn chkr A, instrn C has an associated checker code instn chkr C, and so on. Similarly, the UPE function $f_i$ includes instn chkrs $A_i$ and $B_i$ associated with instructions $A_i$ and $B_i$, respectively. The PED 225 then inserts the respective checker codes in the function codes of respective functions to arrive at modified function codes. Thus, upon insertion, function $f_1$ is modified to $f_2$ to $f_2'$, $f_3$ to $f_3'$, and $f_i$ to $f_i'$. The PED 225 generates a modified executable binary code (MEB) 230 by replacing the original function codes of the respective functions with corresponding modified function codes, as shown in FIG. 3. The MEB 230, upon execution, will trigger the appropriate checker codes which activate a checker associated with the checker code. The checker includes trace statements which provide necessary trace data related to memory access that enables a user to detect potential memory errors in the runtime application.

Figure 4:
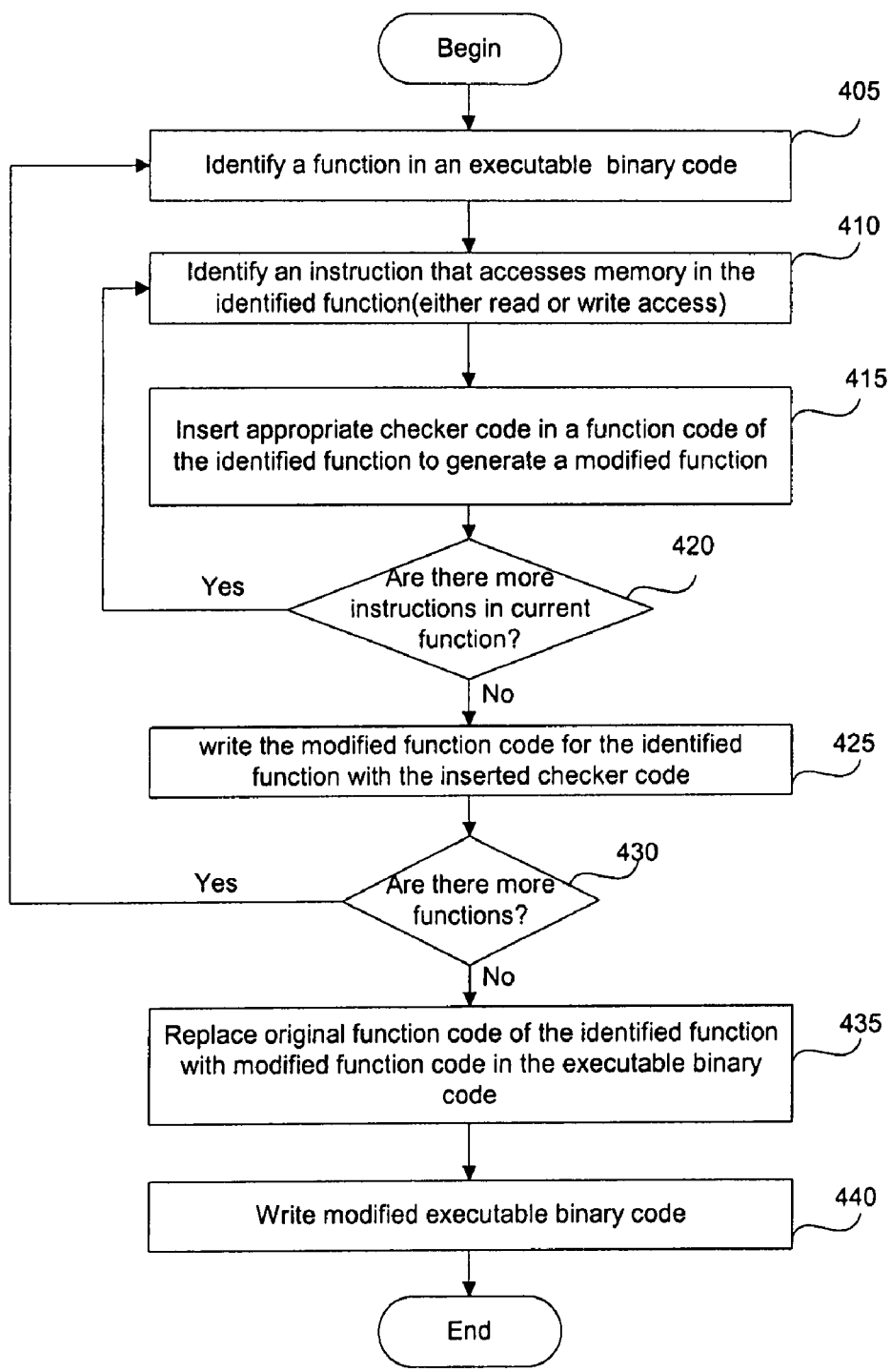
FIG. 4 illustrates a flow chart of operations followed by a binary instrumentation tool executing on a computer system, in one embodiment of the invention.

FIG. 4 illustrates the process operations followed by a binary instrumentation tool executing on a computer system 200, in one embodiment of the invention. The method begins at operation 405 where functions in an executable binary code are identified. The functions, including both calling functions and called functions, are identified by a compiler while compiling the source code to an executable binary code. A plurality of instructions that access memory within the identified functions are identified by the compiler, as illustrated in operation 410. The instructions may include read, write or modify instructions related to data in memory 250. The compiler analyzes the instructions in the identified functions and provides a plurality of compiler annotations that provide essential functional characteristic data of the identified function based on the instructions that accesses memory. For functions that do not provide a source code for the compiler to analyze, such as user provided executables (UPEs), a set of memory semantic descriptions are received through a user interface that provide essential functional characteristic data of the functions with instructions that access memory in the UPEs.

A checker code is defined by a PED 225 for each of the compiler annotations or memory semantic descriptions based on a set of checker code rules made available to the PED 225. The checker code rules may be pre-defined or may be configurable through the user interface 223. The PED 225, then, identifies the instruction that accesses memory and inserts the appropriate checker code into an appropriate location within a function code for the corresponding identified function to generate a modified function code, as shown in operation 415. The method arrives at decision point 420 where the PED 225 determines if there are more instructions within the identified function that access memory. If there are more instructions, the method loops back to operation 410 and proceeds to identify the next instruction within the identified function that accesses memory and inserts an appropriate checker code for that instruction in the appropriate location within the identified function and the process continues till there are no more instructions within the identified function that access memory.

The process then proceeds to operation 425, wherein the modified function code for the identified function is written with inserted checker codes. The process proceeds to the next decision point 430, wherein the PED 225 verifies to see if there are any more functions within the original executable binary code with instructions that access memory. If there are more functions, the process loops back to operation 405 of finding a function. If there are no more functions that access memory, the process proceeds to operation 435, wherein a original function code for the identified function in the original executable binary code is replaced by the modified function code to obtain a modified executable binary code 230. The process concludes with the modified executable binary code 230 being written in memory, as illustrated in operation 440, from where a processor within the computer system 200 will execute the MEB 230.

Sample codes of the binary instrumentation tool are enclosed. The following codes are illustrative codes and are not meant to be restrictive. The codes can be written in other languages or structured differently as long as its functionality enables the process operations of the present invention.

The following example code shows where the uninitialized memory was used and where it was allocated, along with a summary of results when the binary instrumentation tool was run.

```
% cat test_UMR.c
#include <stdio.h>
#include <stdlib.h>
int main( )
{
// UMR: accessing uninitialized data
int *p = (int*) malloc(sizeof(int));
printf("*p = %d\n",*p);
}
```

```
% cc -g -O2-xbinopt=prepare test_UMR.c
% a.out
*p = 131464%
% discover a.out
% a.out
ERROR (UMR): accessing uninitialized data from address
0x50010 (4 bytes)
at:
main( ) + 0x54 [a.out:0x30054]
<test_UMR.c:7>:
4: {
5: // UMR: accessing uninitialized data
6: int *p = (int*) malloc(sizeof(int));
7:=> printf("*p = %d\n",*p);
8:}
_start( ) + 0x108 [a.out:0x107dc]
block at 0x50010 (4 bytes long) was allocated at:
malloc( ) + 0x144 [libdiscover.so:0xellc]
main( ) + 0x1c [a.out:0x3001c]
<test_UMR.c:6>:
3: int main( )
4: {
5: // UMR: accessing uninitialized data
6:=> int *p = (int*) malloc(sizeof(int));
7: printf("*p = 75d\n",*p);
8:}
_start( )+0x108 [a.out:0x107dc]
DISCOVER SUMMARY:
unique errors : 1 (1 total)
unique warnings : 0 (0 total)
*p = 327704
```

The following is a sample ASCII report for a memory access error for reading beyond array bounds. The report consists of error and warning messages followed by a summary. The error message starts with the word "ERROR" and contains a three-letter error code and an error description ("reading memory beyond array bounds" in the example.) Other details include the memory address that was accessed and the number of bytes read or written. Following the description is a stack trace at the time of the error which pinpoints the location of the error in the process life cycle. If the program was compiled with debugging information, the stack trace will include the source file name and line number. And if the source file is accessible, the source in the vicinity of the error is printed. The target source line in each frame is indicated by the "=>" symbol. When the same kind of error at the same memory location (and the same number of bytes) repeats, the complete message including the stack trace prints only once. On subsequent occurrences of the error, only the first line of the error message is printed, followed by a repetition count, as shown.

```
$a.out
ERROR (ABR): reading memory beyond array bounds at
address 0x50030 (4 bytes)
at:
main( ) + 0x188 [a.Out:0x30614]
<discover_example.c:36>:
33: a = f(N);
34: printf("First %d Fibonacci numbers:\n", N);
35: for(i = 0; i <= N; i++) {
36:=> printf("%d\n", a[i]);
37:}
38:
39: /* Print first M=1 Fibonacci numbers */
_start( ) + 0x5c [a.out: 0x105a8]
block at 0x50008 (40 bytes long) was allocated at:
malloc( ) + 0x168 [libdiscover.so:0xea54]
f( ) + 0x1c [a.out:0x3001c]
<discover_example.c:9>:
6:
7: int *f(int n)
8: {
9:=> int *a = (int *)malloc(n * sizeof(int) );
10: int i, j, k;
11:
12: a[0]=1;
main( ) + 0x1c [a.out:0x304a8]
<discover_example.c:33>:
30: int i;
31:
32: /* Print first N=10 Fibonacci numbers */
33:=> a = f(N);
34: printf("First %d Fibonacci numbers:\n", N);
35: for(i = 0; i <= N; i++) {
36: printf("%d\n", a[i]);
_start( ) + 0x5c [a.out: 0x105a8]
...
DISCOVER SUMMARY:
unique errors : 3 (3 total)
unique warnings : 0 (0 total)
$
```

The binary instrumentation tool of the present invention can catch and report many memory access errors such as array bounds read/write, allocating zero size, freeing wrong memory block, bad realloc parameter, double freeing memory, freed memory read/write, freed realloc pointer, invalid memory read/write, partially initialized read, unallocated read/write, uninitialized memory read. The following sample codes are used to capture each of the above mentioned errors.

```
ABR: Array Bounds Read
#include <stdio.h>
#include <stdlib.h>
int main( )
{
// ABR: reading memory beyond array bounds
int *a = (int*) malloc(sizeof(int[5]));
printf("a[5]= %d\n",a[5]);
}
ABW: Array Bounds Write
#include <stdlib.h>
int main( )
{
// ABW: writing to memory beyond array bounds
int *a = (int*) malloc(sizeof(int[5]));
a[5] = 5;
}
AZS: Allocating Zero Size
#include <stdlib.h>
int main( )
{
// AZS: allocating zero size memory block
int *p=malloc(0);
}
BFM: Freeing Wrong Memory Block
#include <stdlib.h>
int main( )
{
// BFM: freeing wrong memory block
int *p = (int*) malloc(sizeof(int));
free(p+1);
}
```

BRP: Bad Realloc Parameter
```
#include <stdlib.h>
int main( )
{
// BRP is "bad address parameter for realloc 0x%1x"
int *p = (int*) realloc(0,sizeof(int));
int *q = (int*) realloc(p+20,sizeof(int[2]));
}
```
DFM: Double Freeing Memory
```
#include <stdlib.h>
int main( )
{
// DFM is "double freeing memory"
int *p = (int*) malloc(sizeof(int));
free(p);
free(p);
}
```
FMR: Freed Memory Read
```
#include <stdio.h>
#include <stdlib.h>
int main( )
{
// FMR is "reading from freed memory at address 0x%1x(%d byte%s)"
int *p = (int*) malloc(sizeof(int));
free(p);
printf("p = 0x%h\n",p);
}
```
FMW: Freed Memory Write
```
#include <stdlib.h>
int main( )
{
// FMW is "writing to freed memory at address 0x%1x(%d byte%s)"
int *p = (int*) malloc(sizeof(int));
free(p);
*p = 1;
}
```
FRP: Freed Realloc Pointer
```
void test_FRP( )
{
// FRP is "freed pointer passed to realloc 0x%1x"
int *p = (int*) malloc(sizeof(int));
free(p);
int *q = (int*) realloc(p,sizeof(int[2]));
```
IMR: Invalid Memory Read
```
#include <stdlib.h>
int main( )
// IMR: read from invalid memory address
int *p = 0;
int i = *p; // generates Signal 11 . . .
}
```
IMW: Invalid Memory Write
```
#include <stdlib.h>
int main( )
{
// IMW: write to invalid memory address
int *p = 0;
*p=1; // generates Signal 11 . . .
}
```
PIR: Partially Initialized Read
```
#include <stdio.h>
#include <stdlib.h>
int main( )
{
// PIR: accessing partially initialized data
int *p = (int*) malloc(sizeof(int));
*((char*)p) = 'c';
printf("*p = %d\n",*p);
}
```
UAR: UnAllocated Read
```
#include <stdio.h>
#include <stdlib.h>
int main( )
{
// UAR is "reading from unallocated memory"
int *p = (int*) malloc(sizeof(int));
printf("*(p+1) = %d\n",*(p+1));
}
```
UAW: UnAllocated Write
```
#include <stdlib.h>
int main( )
// UAW is "writing to unallocated memory"
int *p = (int*) malloc(sizeof(int));
*(p+1) = 1;
}
```
UMR: Uninitialized Memory Read
```
#include <stdio.h>
#include <stdlib.h>
int main( )
{
// UMR is "accessing uninitialized data from address 0x%1x (%d bytes)"
int *p = (int*) malloc(sizeof(int));
printf("*p = %d\n",*p);
}
```

Although the current embodiments of the invention have been elaborately described for providing a tool to detect a potential memory error, the current embodiments of the invention could be extended to detect other types of error or to provide other diagnostic information. As the binary executable code has already been compiled and the insertions of the checker codes are provided at the compiled code level, the binary instrumentation tool provides a robust but flexible tool that is able to detect memory error problems of codes that are both native and non-native to the computer system 200.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing a binary instrumentation using a binary instrumentation tool to detect memory problems in runtime application executing on a computer system, the method comprising:
    examining a source code of a runtime application to identify a function having an instruction that accesses memory on the computer system, wherein the source code includes a user provided executable code (UPE), the UPE including a function having an instruction that accesses memory;
    generating an annotation section when compiling the source code into an executable binary code by a compiler, the annotation section including one or more compiler annotations provided by the compiler for the identified function having one or more instructions, the compiler annotations defining essential functional characteristic data related to the identified function based on examination of the one or more instructions and providing guidelines for inserting checker codes, the generated annotation section associated with the executable binary code;
    defining and inserting a checker code into the original function code of the identified function to obtain a modified function code based on the guidelines provided by compiler annotations in the annotation section associated with the function, the checker code defined by the program error detector (PED); and
    generating a modified executable binary code of the runtime application by replacing the original function code of the identified function with the corresponding modified function code, the modified executable binary code generated by the PED based on the annotations associated with the identified function, the modified executable binary code invoking a checker upon execution of the appropriate function, the checker enabling efficient detection of program memory errors associated with the identified function, wherein the operations of examining, generating and defining are performed by a processor of a computer.

2. The method for providing a binary instrumentation using a binary instrumentation tool to detect memory problems in runtime application executing on a computer system of claim 1, wherein the compiler annotations define essential functional characteristic data related to the identified function.

3. The method for providing a binary instrumentation using a binary instrumentation tool to detect memory problems in runtime application executing on a computer system of claim 1, wherein the source code is a program code associated with the runtime application and the examination of the source code is performed by the compiler.

4. The method for providing a binary instrumentation using a binary instrumentation tool to detect memory problems in runtime application executing on a computer system of claim 1, wherein the source code includes a user provided executable code (UPE), the UPE including a function having an instruction that accesses memory, the examination of the UPE is performed through a user interface, wherein the UPE is not associated with any compiler annotations.

5. The method for providing a binary instrumentation using a binary instrumentation tool to detect memory problems in runtime application executing on a computer system of claim 4, further including receiving a memory semantic description for the function having the instruction that accesses memory, the memory semantic description defining essential functional characteristic data related to the function in the UPE based on the examination of the function through the user interface, the memory semantic description integrated into a memory semantic description file.

6. The method for providing a binary instrumentation using a binary instrumentation tool to detect memory problems in runtime application executing on a computer system of claim 5, wherein defining a checker code further including defining a checker code for each memory semantic description in the memory semantic description file associated with the function in the UPE, the checker code defined by the PED.

7. The method for providing a binary instrumentation using a binary instrumentation tool to detect memory problems in runtime application executing on a computer system of claim 6, wherein the PED uses a plurality of checker code rules when defining the checker code for the function having instruction that accesses memory, the checker code rules based on compiler annotations, memory semantic descriptions associated with the function and type of error to be tracked.

8. The method for providing a binary instrumentation using a binary instrumentation tool to detect memory problems in runtime application executing on a computer system of claim 4, wherein generating a modified executable binary code of the runtime application further including inserting the checker code associated with each function in the UPE at an appropriate location within the original executable binary code, the insertion of the checker code performed by the PED based on the memory semantic description associated with the appropriate function.

9. The method for providing a binary instrumentation using a binary instrumentation tool to detect memory problems in runtime application executing on a computer system of claim 4, where in the UPE is anyone of a shared library, a non-native executable code or an assembly language code.

10. The method for providing a binary instrumentation using a binary instrumentation tool to detect memory problems in runtime application executing on a computer system of claim 9, wherein the shared library, the non-native executable code and the assembly language code are fully tested.

11. The method for providing a binary instrumentation using a binary instrumentation tool to detect memory problems in runtime application executing on a computer system of claim 1, wherein the essential functional characteristic data associated with the function include function identification, boundaries of the function, list of all possible jump locations of the function, location of the function within a compiled binary file, reference to function location from code or data, information on incoming and outgoing function arguments, references to functions from non-executable code (data).

12. The method for providing a binary instrumentation using a binary instrumentation tool to detect memory problems in runtime application executing on a computer system of claim 1, wherein the program memory errors that may be detected include any one of uninitialized variable usage, memory leaks along with the corresponding location, array access violation, stack access violation, access beyond stack bounds, access beyond array bounds, incorrect parameter for function calls, unallocated memory read, double free memory, free memory read, partially initialized data access.

13. The method for providing a binary instrumentation using a binary instrumentation tool to detect memory problems in runtime application executing on a computer system of claim 1, wherein the PED is pre-defined based on type of compiler annotations associated with the function.

14. A system for providing binary instrumentation using a binary instrumentation tool to detect memory problems in runtime application executing on a computer system, the system comprising:
  a processor for providing binary instrumentation;
  a compiler to compile the source code of the runtime application into a plurality of compiled objects, the runtime application having a function with an instruction that accesses memory, the compiler further configured to identify a function with instructions that access memory and to generate an annotation section, the annotation section including one or more compiler annotations associated with the identified function, the compiler annotations defining essential functional characteristic data related to the identified function based on examination of the instruction and providing guidelines, wherein the source code includes a user provided executable code (UPE), the UPE including a function having an instruction that accesses memory, wherein the UPE is not associated with any compiler annotations;
  a link editor to assemble the compiled objects generated by the compiler into an executable binary code of the runtime application, the generated annotation section associated with the executable binary code; and
  a program error detector configured to define and insert a checker code into the identified function to obtain a modified function code based on guidelines provided by compiler annotations in the annotation section associated with the identified function and to generate a modified executable binary code by replacing a original function code for the function in the runtime application having instructions that access memory with the modified function code, the checker code invoking a checker upon execution of the corresponding function in the modified executable binary code,
  wherein the invoked checker efficiently detects program memory error during execution of the runtime application.

15. The system for providing binary instrumentation using a binary instrumentation tool to detect memory problems in runtime application executing on a computer system of claim 14, further including a user interface to receive memory semantic description for the function having the instruction to access memory in the UPE, the memory semantic description incorporated into a memory semantic file, the memory semantic description providing essential functional characteristic data related to the identified function in the UPE, the memory semantic file associated with the function in the UPE.

16. The system for providing binary instrumentation using a binary instrumentation tool to detect memory problems in runtime application executing on a computer system of claim 15, wherein the user interface includes an input device to receive memory semantic description and an output device to display a set of UPEs available to the source code in order to receive memory semantic descriptions of one or more functions that access memory in each UPE and to display the program errors detected during the execution of the modified executable binary code of the runtime application.

17. The system for providing binary instrumentation using a binary instrumentation tool to detect memory problems in runtime application executing on a computer system of claim 15, wherein the program error detector further including:
  a memory access detector to detect a function in the runtime application having an instruction that accesses memory;
  a checker generator to generate checker code based on guidelines provided by the compiler annotations in the annotation section and by the memory semantic description in the memory semantic file associated with the function detected by the memory access detector;
  a binary writer to generate a modified executable binary code of the runtime application, the modified executable binary code generated by replacing a original function code of a function in the executable binary code with a modified function code having associated compiler annotations or by inserting checker code into an appropriate location of the executable binary code,
  wherein the modified function code for the function obtained by inserting the appropriate checker code into the function code for the corresponding function.

18. The system for providing binary instrumentation using a binary instrumentation tool to detect memory problems in runtime application executing on a computer system of claim 14, wherein the link editor is integrated with the compiler.

19. The system for providing binary instrumentation using a binary instrumentation tool to detect memory problems in runtime application executing on a computer system of claim 15, wherein the essential functional characteristic data associated with the function include function identification, boundaries of the function, list of all possible jump locations of the function, location of the function within the source code, information on incoming and outgoing function arguments, references to functions from non-executable code (data).

20. The system for providing binary instrumentation using a binary instrumentation tool to detect memory problems in runtime application executing on a computer system of claim 14, wherein the program errors that may be detected include any one of uninitialized variable usage, memory leaks along with the corresponding location, array access violation, stack access violation, access beyond stack bounds, access beyond array bounds, incorrect parameter for function calls, unallocated memory read, double free memory, free memory read, partially initialized data access.

* * * * *